United States Patent
Sun et al.

(10) Patent No.: US 9,762,417 B1
(45) Date of Patent: Sep. 12, 2017

(54) ADAPTIVE EQUALIZATION FOR VESTIGIAL SIDEBAND (VSB) TRANSMISSIONS

(71) Applicant: INTEGRA RESEARCH AND DEVELOPMENT, LLC, Latham, NY (US)

(72) Inventors: Chen-Kuo Sun, Escondido, CA (US); Paul N. Huntley, Poway, CA (US); Charlie Chen, Santa Clara, CA (US); Dingbo Chen, San Diego, CA (US)

(73) Assignee: Integra Research and Development, LLC, Latham, NY (US)

( * ) Notice: Subject to any disclaimer, the term of this patent is extended or adjusted under 35 U.S.C. 154(b) by 0 days.

(21) Appl. No.: 15/278,859

(22) Filed: Sep. 28, 2016

(51) Int. Cl.
| | |
|---|---|
| *H04B 10/00* | (2013.01) |
| *H04L 25/03* | (2006.01) |
| *H04B 10/079* | (2013.01) |
| *H04B 10/69* | (2013.01) |
| *H04B 10/516* | (2013.01) |

(52) U.S. Cl.
CPC . *H04L 25/03343* (2013.01); *H04B 10/07953* (2013.01); *H04B 10/5161* (2013.01); *H04B 10/6971* (2013.01); *H04B 10/6972* (2013.01)

(58) Field of Classification Search
CPC ... H04L 2025/03808; H04L 2027/0042; H04L 27/01; H04L 25/03343; H04L 2025/03382; H04B 10/07953; H04B 10/5161; H04B 10/6971; H04B 10/6972; H04B 10/2504; H04B 10/2507; H04B 10/2575; H04B 10/58; H04B 2210/254

USPC ......... 398/27, 149, 158, 160, 161, 162, 192, 398/193
See application file for complete search history.

(56) References Cited

U.S. PATENT DOCUMENTS

| | | | | |
|---|---|---|---|---|
| 3,670,269 | A * | 6/1972 | Starr | H04B 3/04 333/18 |
| 4,096,454 | A * | 6/1978 | Behrend | H03H 9/02834 327/100 |
| 7,035,538 | B2 * | 4/2006 | Willner | H04B 10/07 398/29 |
| 7,127,181 | B2 * | 10/2006 | Gnauck | H04B 10/2507 398/159 |
| 7,369,600 | B2 * | 5/2008 | Upton | H03L 7/0995 324/76.33 |
| 7,747,172 | B2 * | 6/2010 | Hayee | H04B 10/6971 398/149 |
| 8,437,645 | B2 * | 5/2013 | Boffi | H04B 10/61 398/152 |
| 8,913,901 | B2 * | 12/2014 | Zhang | H04B 10/613 375/232 |
| 8,976,445 | B1 * | 3/2015 | Willner | G02F 1/353 359/326 |

(Continued)

*Primary Examiner* — Hibret Woldekidan
(74) *Attorney, Agent, or Firm* — Nydegger & Associates

(57) ABSTRACT

The present invention pertains to systems and methods for equalizing a digitally modulated input signal for transmission as an optical signal over an optical fiber. In detail, this equalization is accomplished prior to the signal's conversion to an optical signal, and prior to the signal being filtered by a vestigial sideband (VSB) filter. In particular, equalization is accomplished by giving weights to the taps of a tapped delay equalizer, wherein weights for respective taps are derived from the output signal after its conversion to a digital signal at the downstream end of the optical fiber.

20 Claims, 2 Drawing Sheets

(56) References Cited

U.S. PATENT DOCUMENTS

| | | | | |
|---|---|---|---|---|
| 2003/0058509 A1* | 3/2003 | Webb | ................... | H04B 10/503 |
| | | | | 398/197 |
| 2010/0322637 A1* | 12/2010 | Hayee | ................ | H04B 10/6971 |
| | | | | 398/158 |
| 2016/0149642 A1* | 5/2016 | Sun | ........................ | H04B 10/58 |
| | | | | 398/116 |
| 2017/0078027 A1* | 3/2017 | Okabe | .................... | H04B 10/58 |

* cited by examiner

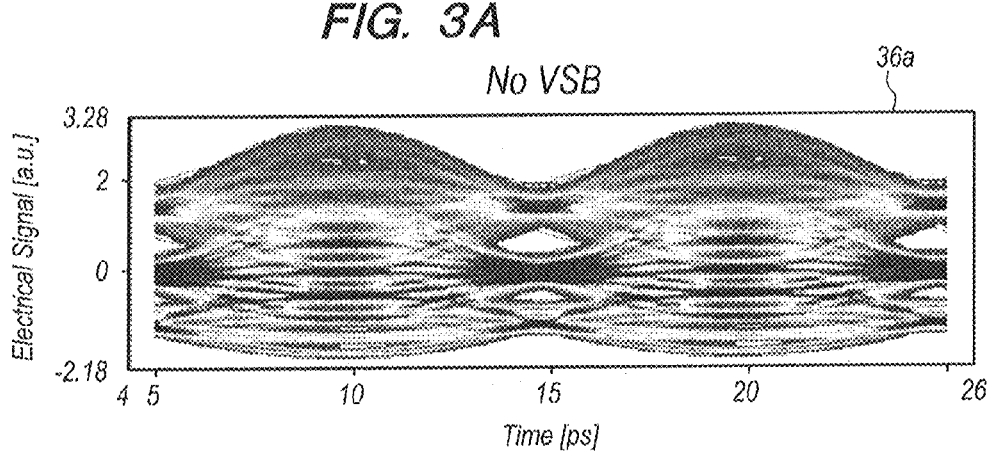
FIG. 3A No VSB
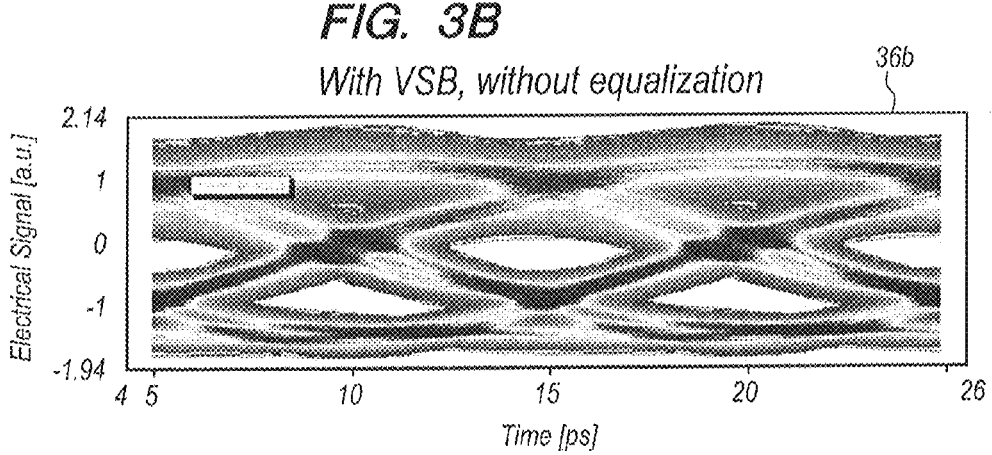
FIG. 3B With VSB, without equalization
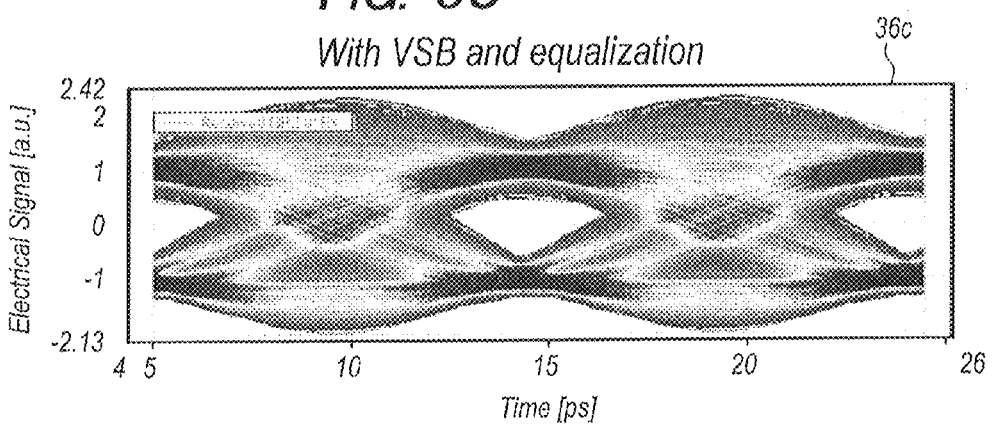
FIG. 3C With VSB and equalization

ADAPTIVE EQUALIZATION FOR VESTIGIAL SIDEBAND (VSB) TRANSMISSIONS

FIELD OF THE INVENTION

The present invention pertains to systems and methods for equalizing an input signal to an optical vestigial sideband (VSB) filter. In particular, the present invention pertains to signal transmission systems wherein digitally modulated signals are to be filtered as optical signals by an optical VSB filter and then transmitted over an optical fiber. The present invention pertains particularly, but not exclusively, to systems and methods that incorporate a tapped delay equalizer which equalizes a digitally modulated input signal for transmission over an optical fiber, wherein tap weights for the tapped delay equalizer are derived from the output signal at the downstream end of the fiber optic.

BACKGROUND OF THE INVENTION

When an optical signal is modulated for transmission through an optical fiber on a carrier frequency $f_c$ ($f_c = C/\lambda$ where C is a constant and $\lambda$ is the optical wavelength), the modulated information signal will have two symmetric sidebands that are centered on the carrier frequency. In order to reduce fading due to fiber dispersion, and to conserve bandwidth in the transmission of such a signal, the optimal solution is to filter out one of the sidebands, either above or below $f_c$. For various technical reasons, however, simultaneous preservation of one complete sideband and a complete removal of the other sideband is impossible. Nevertheless, although one of the sidebands may be partially suppressed, the complete preservation of the other sideband for transmission is highly desirable.

A partial solution for the difficulty mentioned above, is the use of a vestigial sideband (VSB) filter. As is well known in the pertinent art, a VSB filter is a band pass filter that effectively preserves one sideband while partially suppressing the other sideband. Just how much of the unwanted sideband can be actually suppressed, however, is a design consideration. As noted above, it is virtually impossible to suppress 100% of the unwanted sideband. The portion of the sideband which cannot be suppressed is then referred to as the vestigial sideband (VSB).

During a signal transmission it will happen that the VSB, which is transmitted with the unsuppressed sideband, will introduce impairments (distortions) into the transmitted signal. For signal integrity, these impairments need to be avoided, or at least minimized. For example, it is known that telecommunication signals can be adversely affected by group delays (i.e. time delays of amplitude envelopes), and phase delays (i.e. time delays of signal phase). Both of these types of delays result from interferences caused by the VSB. Also, and perhaps of greater concern, are Inter Symbol Interferences (ISI) that are introduced by the VSB during the demodulation of digital signals from an analog carrier signal. In any event, an optical information signal which is transmitted over an optical fiber will be somehow corrupted.

The primary object of VSB control is obviously to minimize impairments (distortions) in the received signal, while also preserving the integrity of the transmitted information signal as much as possible. With this objective in mind, closed loop feedback control technology has provided interesting possibilities.

In the context of signal telecommunications, an overview of closed loop control for a desired system output requires comparing the actual output of a system with the actual system input. In the case of a telecommunications system which seeks to preserve signal integrity, the desired system output will be the same as the system input (i.e. a signal transmission that results in a non-corrupted signal). When they are not the same, the signal has been corrupted during transmission. In this later case, a comparison of the actual output with the actual system input will generate an error signal. In a communications system, where it is known that the transmitted signal will be corrupted, the object is then to minimize the error signal. In essence, the question is what feedback will most effectively minimize the error signal.

An example of employing closed loop technology to control signal transmission using a VSB filter is provided by U.S. Pub. No. 2003/0058509 (hereinafter referred to as "Webb"). As disclosed in Webb, the control loop is used to adjust the wavelength of a laser that is providing the carrier frequency. Alternatively, Webb discloses the use of a wavelength control block to control the filter edge of the VSB filter. Unlike the disclosure of Webb, the present invention incorporates a tapped delay equalizer in the feedback loop which is established to reshape the input signal for the purpose of improving a VSB filter.

In light of the above, it is an object of the present invention to provide a system and method for equalizing a digitally modulated signal, for input as an optical signal to an optical VSB filter, for transmission of the optical signal over an optical fiber. Another object of the present invention is to provide a device which employs a tapped delay equalizer to equalize a digitally modulated signal for subsequent conversion and filtering as an optical signal by a VSB filter for transmission over an optical fiber. Still another object of the present invention is to provide a system for using a tapped delay equalizer, in combination with a VSB filter, to transmit optical signals over an optical fiber which is easy to manufacture, is simple to use and which is comparatively cost effective.

SUMMARY OF THE INVENTION

In accordance with the present invention, a system is provided for transmitting a digital information signal, as an optical information signal, over an optical fiber. After transmission over the optical fiber, the optical information signal is converted back into a digital information signal for further transmission. An important aspect of the present invention is the incorporation of a vestigial sideband (VSB) optical filter into the system which has been equalized to improve the VSB filter. For the present invention, this improvement is further improved by equalizing the digital information signal that is provided as the input to the system. For the present invention, the additional improvement afforded by equalization is provided by a tapped delay equalizer. In particular, this equalization compensates for signal impairments introduced by the VSB filter.

As envisioned for the present invention, the digital information signal can be a non-return to zero (NRZ) digital signal, a return to zero (RZ) digital signal, a quadrature amplitude modulation (QAM) signal, a duo-binary signal or any other suitable signal known in the pertinent art. Importantly, whatever digital information signal is used as the input signal, it will be characterized by a symbol rate, $R_s$, and a time duration, T, for each symbol, with $R_s = 1/T$.

Structurally, the system includes a transmitter which receives a digital information signal as an electrical input, and it outputs an optical information signal for transmission over an optical fiber. To perform this function, the transmitter includes a driver chip, an electrical to optical (E/O) converter and an optical VSB filter, such as an optical thin film filter.

In this combination, the driver chip is provided for conditioning the electrical signal upstream of the E/O converter. To do this, the driver chip includes a tapped delay equalizer, an amplifier with gain and bias control, and a control circuitry for operating the driver chip. As indicated above, taps of the tapped delay equalizer are adjustable to alter the shape of the electrical signal (i.e. the digital information signal) that is input at the E/O converter.

In detail, the tapped delay equalizer which is positioned on the driver chip to receive the digital information signal as an input will have an n-number of taps. For the present invention, a time delay, $d_t$, between adjacent taps can be engineered as desired for the particular driver chip. Accordingly, the chip needs to be configured with $d_t < T$. Moreover, although $d_t$ may be the same between all adjacent taps (i.e. $d_{t-1} = d_t = d_{t+1}$), depending on the needs of the particular system, this may not necessarily be so (i.e. $d_{t-1} \neq d_t$ and/or $d_t \neq d_{t+1}$). Further, using the n-number of taps, the adjustable equalizer will include an N-number of taps per symbol in the information signal. In general, the tapped delay equalizer is established with n-greater than N, and N greater than one (n>N>1). In this arrangement each tap is weighted, at least in part, based on the operational parameters of the VSB filter. As is well known by the skilled artisan, these operational parameters typically include a phase position of the VSB filter relative to the information signal, selectively measured amplitudes from the optical information signal, and group delays encountered between tap samples of the information signal.

Operationally, the tapped delay equalizer is employed to reshape the input digital information signal, to thereby compensate for impairments which are introduced into the optical information signal by the optical VSB filter. It is noteworthy that this signal reshaping can also account for variations in signal quality due to the length of the optical fiber. Further, in some implementations of the present invention, signal quality downstream of the optical fiber can be measured and the resulting data included for adjustments of the tapped delay equalizer.

On the driver chip, the amplifier with gain and bias control is connected to receive the shaped signal from the tapped delay equalizer. With this connection, the amplifier provides gain for the shaped signal, and it includes a biasing element to bias the shaped signal. The result here is an electrical digital information output signal from the driver chip which has a proper operating point.

Control circuitry, in addition to the tapped delay equalizer and the amplifier, is also provided on the driver chip. As indicated above, with the connection between the amplifier and the control circuitry, a suitable gain and a bias for the amplifier can be established. On the other hand, the connection between the control circuitry and the tapped delay equalizer allows the tap weights for individual taps of the tapped delay equalizer to be adjusted. The collective result of these corrective actions is a digital information signal that is ready for conversion to an optical information signal.

As indicated above, measurements of signal quality downstream of the optical fiber are to be used to adjust the equalizer. To do this, an analyzer is included in the system. Specifically, the analyzer is connected between the output of an optical to electrical (O/E) device at the downstream end of the fiber optic, and the driver/equalizer at the upstream end of the fiber optic. With this connection, the analyzer can be used to determine a transmission quality parameter such as a bit error rate (BER), along with other signal impairments mentioned above that have been introduced by the VSB optical filter and the optical fiber.

In more detail, the analyzer is connected between the O/E device and the tapped delay equalizer of the driver/equalizer to analyze samples of the digital information signal that is received downstream from the optical fiber. For this purpose the analyzer will include an oscilloscope that is connected into the analyzer to generate an eye diagram of the received digital information signal. Using the eye diagram, an n-number of values from the received digital information signal that are respectively based on operational parameters of the VSB filter are determined. These values are then used to create a control signal input to the tapped delay equalizer for respectively weighting each of the n taps of the tapped delay equalizer, to thereby minimize impairments introduced into the received information signal.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3A is an eye diagram of a digital output signal, when a digitally modulated input signal has been transmitted as an optical signal over a fiber optic, when no optical VSB filter is used in signal transmission;

FIG. 3B is an eye diagram of a digital output signal, when a digitally modulated input signal has been transmitted as an optical signal over a fiber optic, when a VSB filter has been used in signal transmission; and FIG. 3C is an eye diagram of a digital output signal, when a digitally modulated input signal has been transmitted as an optical signal over a fiber optic, when the digitally modulated input signal has been equalized and an optical VSB filter has been used in signal transmission.

DESCRIPTION OF THE PREFERRED
EMBODIMENTS

Figure 1:
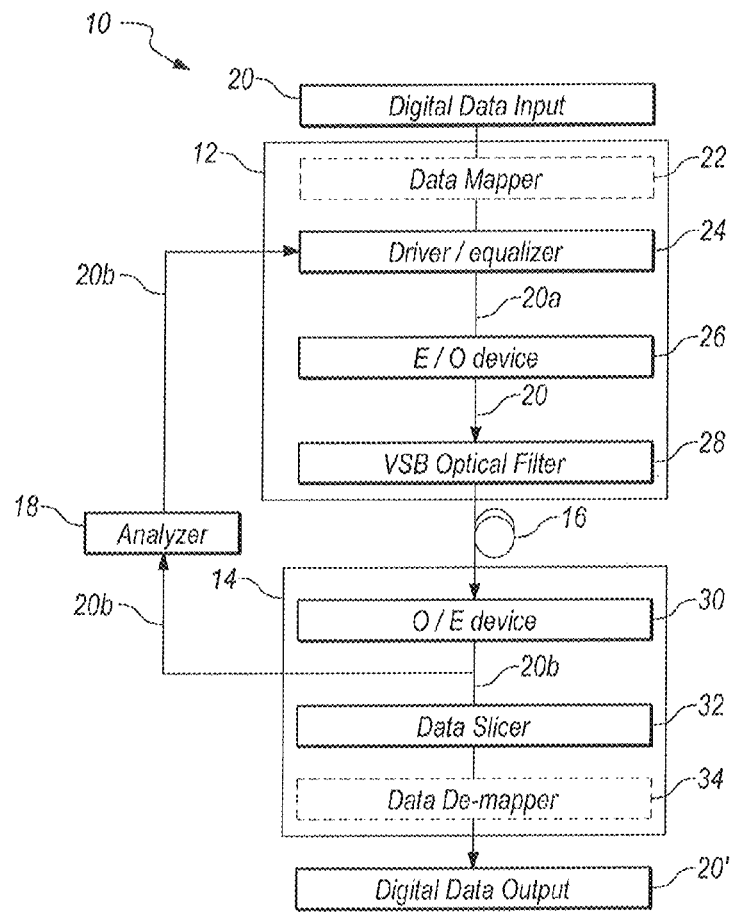
FIG. 1 is a schematic presentation of a communications link for transmitting a digitally modulated signal over an optical fiber in accordance with the present invention.

Referring initially to FIG. 1, a system for transmitting optical signals in accordance with the present invention is shown, and is generally designated 10. As shown, the system includes a transmitter 12 and a receiver 14 that are interconnected with each other by an optical fiber 16. FIG. 1 also shows that the system 10 includes an analyzer 18 which interconnects the receiver 14 with the transmitter 12.

In overview, a digitally modulated information signal 20 is provided as input to the system 10 for transmission over the optical fiber 16 from the transmitter 12 to the receiver 14. As envisioned for the present invention the digitally modulated information signal 20 will have a predetermined symbol rate, $R_s$, and it will have characteristics and parameters that are well known in the art.

For the present invention, it is to be appreciated that the digitally modulated information signal 20 will experience several transformations as it passes through the system 10. With this in mind, the general descriptor "information signal 20" is used in all references to the basic signal for all variations of the information signal 20. In particular, these references include: 1) the original digitally modulated input information signal 20; 2) a digital (electrical) pre-transit equalized information signal 20a; 3) an optical information signal 20 which is transmitted over the optical fiber 16; 4) a digital (electrical) post-transit information signal 20b; and 5) a digitally modulated output information signal 20' which is received by a user of the system 10. For reference purposes, these references for information signal 20 are all shown in FIG. 1.

As shown in FIG. 1, the transmitter 12 includes a data mapper 22 (optional) which may be provided to handle and format the input information signal 20 for data transfer purposes. Also included in the transmitter 12 is a driver/equalizer chip 24 which is provided to equalize the input information signal 20 for maximum transmission efficiency through the system 10. In accordance with the present invention, once the input information signal 20 has been equalized, the resulting pre-transit equalized information signal 20a is converted into the optical information signal 20 by an Electrical/Optical (E/O) device 26.

Still referring to FIG. 1, a vestigial sideband (VSB) filter 28 is provided with the transmitter 12 for filtering the optical information signal 20. Once it is filtered, the optical information signal 20 is then passed to the optical fiber 16 for transmission over the optical fiber 16 to the receiver 14. As is well known, the VSB filter 28 and the optical fiber 16 will introduce impairments to the optical information signal 20 during this transmission. In particular, the impairments will include phase delays in the optical information signal 20, as well as group delays.

Upon receipt of the optical information signal 20 at the receiver 14, an Optical/Electrical (O/E) device 30 is provided to convert the optical information signal 20 into a digital, post-transit information signal 20b. FIG. 1 shows that the post-transit information signal 20b passes through a data slicer 32 where the data in signal 20b can be appropriately narrowed. Also, a de-mapper 34 is provided, if necessary.

Still referring to FIG. 1, it will be seen that the post-transit information signal 20b can also be passed from the O/E device 30 to the analyzer 18. As envisioned for the present invention, the analyzer 18 will typically include an oscilloscope which presents the post-transit information signal 20b as an eye diagram 36 (see FIGS. 3A, 3B). The post-transit information signal 20b is then passed back from the analyzer 18 to the driver/equalizer chip 24 of the transmitter 12.

Figure 2:
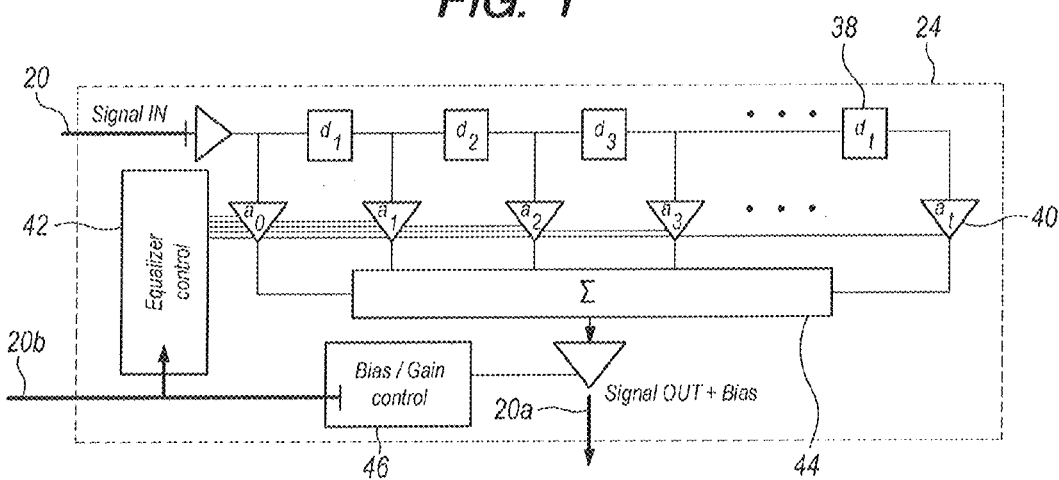
FIG. 2 is a schematic presentation of a driver/equalizer chip in accordance with the present invention, for use in the communications link shown in FIG. 1.

FIG. 2 shows that the driver/equalizer chip 24 includes an n-number of taps 38 which each have a respective delay $d_t$. Importantly, individual delays $d_t$ can be engineered for the driver/equalizer chip 24 as required for its particular application. Stated differently, $d_t$ may be equal to $d_{t-1}$, or it may not. Also included in the driver/equalizer chip 24 are an n-number of amplifiers 40 which are respectively connected with the same n-numbered taps 38. Importantly, for an operation of the present invention, there must be an N-number of taps 38 per symbol in the digitally modulated input information signal 20, where N is greater than 1. Thus, n (total number of taps 38) must be equal to, or greater than 1.

As intended for the present invention, the analyzer 18 creates an eye diagram 36 which can be used to optimize a transmission of the optical information signal 20 over the optical fiber 16. In particular, using the eye diagram 36 as a reference, an n-number of values are obtained from the post-transit information signal 20b. The n-number of values which are obtained are then used by an equalizer control 42 in the driver/equalizer chip 24. Specifically, the obtained values are used by the equalizer control 42 to establish amplitude control for the respectively numbered amplifiers 40.

FIG. 2 also indicates that a summer 44 in the driver/equalizer chip 24 sums the outputs of the n-number of amplifiers 40. Also, a bias/gain control 46 is provided which, together with the summer 44, create the pre-transit equalized information signal 20a.

In overview, the driver/equalizer chip 24 functions as a feedback control which operates to equalize the digitally modulated input information signal 20 for efficient transmission of the input information signal 20 from the transmitter 12 to the receiver 14. Thus, at the receiver 14, the post-transit information signal 20b is received as a VSB filtered output information signal 20' having a substantially same information content as the input information signal 20.

FIGS. 3A-C are provided to respectively show typical eye diagrams 36 a-c which are created by the analyzer 18. As shown, FIG. 3A shows a post-transit information signal 20b which has not been filtered by a VSB filter 28. FIG. 3B shows a signal 20b which has been filtered by a VSB filter 28, but not equalized. And, FIG. 3C shows a signal 20b which has been both filtered and equalized. As is well known by the skilled artisan, the eye diagram 36c in FIG. 3C is preferable.

While the particular Adaptive Equalization for Vestigial Sideband (VSB) Transmissions as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for transmitting a digitally modulated information signal as an optical information signal over an optical fiber, the system comprising:

a transmitter for generating a digital information signal, wherein the digital information signal has a predetermined symbol rate, $R_s$;

a tapped delay equalizer connected to the transmitter for receiving and equalizing the digital information signal, wherein the tapped delay equalizer has an n-number of taps, with an N-number of taps per symbol in the digital information signal, and wherein n is greater than N, and N is greater than 1 (n>N>1);

an electrical to optical (E/O) device connected to the tapped delay equalizer for converting the digital information signal into an optical information signal;

a vestigial sideband (VSB) filter connected to the E/O device for receiving and filtering the optical information signal, wherein the VSB filter is connected to a first end of the optical fiber for transmission of the optical information over the optical fiber to a second end of the optical fiber;

an optical to electrical (O/E) device connected to the second end of the optical fiber for receiving and converting the optical information signal to a received digital information signal; and an analyzer connected between the O/E device and the tapped delay equalizer to analyze samples of the received digital information signal and to determine therefrom an n-number of values derived from the received digital information signal to create a control signal input to the tapped delay equalizer, for respectively weighting each of the n taps of the tapped delay equalizer to minimize impairments introduced into the information signal by the VSB filter.

2. The system recited in claim 1 wherein the received digital information signal is impaired by operational parameters from the optical fiber and from the VSB filter, including a phase position relative to the information signal, selectively measured amplitudes from the information signal, and group delays encountered between tap samples of the information signal.

3. The system recited in claim 1 wherein the tapped delay equalizer is incorporated with the E/O device in an electrical to optical (E/O) converter driver chip.

4. The system recited in claim 1 wherein the information signal is selected from the group of signals consisting of a non-return to zero digital signal, a return to zero digital signal, a quadrature amplitude modulation signal and a duo-binary signal.

5. The system recited in claim 1 wherein the vestigial sideband (VSB) filter is an optical filter.

6. The system recited in claim 1 wherein the vestigial sideband (VSB) filter is an optical thin film filter.

7. The system recited in claim 1 wherein the control signal includes information of the VSB filter indicative of a transmission quality parameter.

8. The system recited in claim 7 wherein the transmission quality parameter corresponds to a bit error rate (BER).

9. The system recited in claim 1 wherein the analyzer includes an oscilloscope and the determination of an n-number of values to create the control signal is performed by employing the oscilloscope to analyze an eye diagram.

10. A device for equalizing a digitally modulated information signal for transmission of the information signal over an optical fiber, wherein the information signal has a predetermined symbol rate, $R_s$, the device comprising:
a first input port for receiving the digitally modulated information signal;
a tapped delay equalizer having an n-number of taps, with an N-number of taps per symbol in the digital information signal, and wherein n is greater than N, and N is greater than 1 (n>N>1), and an n-number of amplifiers, wherein each amplifier is connected with a respective tap for generating a pre-transit equalized digital information signal;
an output port for transmission of the pre-transit information signal through a VSB filter over the optical fiber, with a consequent creation of a post-transit equalized digital information signal;
a second input port for receiving the post-transit equalized digital information signal; and
an equalizer control for using an n-number of values derived from the post-transit digital information signal to create a control signal input to the tapped delay equalizer, for respectively weighting each of the n taps of the tapped delay equalizer to minimize impairments introduced into the information signal by the VSB filter and the optical fiber.

11. The device recited in claim 10 wherein the optical fiber is a component of an optical communications link, and wherein the communications link comprises:
an electrical/optical (E/O) converter for converting the pre-transit signal from a digital signal into an optical signal, wherein the optical signal is filtered by the VSB filter prior to transmission over the optical fiber; and
an optical/electrical (O/E) converter for converting the filtered and transmitted optical signal to the post-transit signal.

12. The device recited in claim 11 wherein the post-transit digital information signal is impaired by operational parameters from the optical fiber and from the VSB filter, including phase delays in phase position relative to the information signal, and group delays encountered between tap samples of the information signal.

13. The device recited in claim 10 wherein the digitally modulated information signal is selected from the group of signals consisting of a non-return to zero digital signal, a return to zero digital signal, a quadrature amplitude modulation signal and a duo-binary signal.

14. The device recited in claim 10 wherein the vestigial sideband (VSB) filter is an optical thin film filter.

15. The device recited in claim 10 wherein the control signal includes information of the VSB filter indicative of a transmission quality parameter including a bit error rate (BER).

16. The device recited in claim 10 wherein the analyzer includes an oscilloscope and the derivation of an n-number of values to create the control signal is performed by employing the oscilloscope to analyze an eye diagram.

17. A method for equalizing a digitally modulated information signal for transmission of the information signal over an optical fiber, wherein the information signal has a predetermined symbol rate, $R_s$, the method comprising the steps of:
providing a tapped delay equalizer having an n-number of taps, with an N-number of taps per symbol in the digital information signal, and wherein n is greater than N, and N is greater than 1 (n>N>1), and an n-number of amplifiers, wherein each amplifier is connected with a respective tap of the tapped delay equalizer;
equalizing the digitally modulated information signal with the tapped delay equalizer to generate a pre-transit information signal;
converting the pre-transit information signal into an optical information signal;
transmitting the optical information signal through a VSB filter and over an optical fiber;
converting the optical information signal into a post-transit digital information signal after the transmitting step, wherein the post-transit information signal is impaired by operational parameters introduced by the VSB filter and the optical fiber during the transmitting step;
deriving an n-number of values from the post-transit digital information system; and
using the n-number of values obtained during the deriving step to respectively weight each of the n taps of the tapped delay equalizer to minimize impairments introduced into the information signal during the transmitting step.

18. The method recited in claim 17 further comprising the steps of:
analyzing the post-transit digital information signal with an oscilloscope to create an eye diagram;
obtaining the n-number of values during the deriving step from the eye diagram; and
configuring the tapped delay equalizer with the n-number of values for the equalizing step.

19. The method recited in claim 17 wherein the digitally modulated information signal is selected from the group of signals consisting of a non-return to zero digital signal, a return to zero digital signal, a quadrature amplitude modulation signal and a duo-binary signal.

20. The method recited in claim 17 wherein the vestigial sideband (VSB) filter is an optical thin film filter.

* * * * *